(12) United States Patent
Iwasa et al.

(10) Patent No.: US 7,914,062 B2
(45) Date of Patent: Mar. 29, 2011

(54) LOCK APPARATUS FOR VEHICLE SEAT

(75) Inventors: Kazuya Iwasa, Obu (JP); Hiroaki Hayahara, Seto (JP)

(73) Assignees: Aisin Seiki Kabushiki Kaisha, Kariya-shi (JP); Toyota Boshoku Kabushiki Kaisha, Kariya-shi (JP)

( * ) Notice: Subject to any disclaimer, the term of this patent is extended or adjusted under 35 U.S.C. 154(b) by 0 days.

(21) Appl. No.: 12/767,151

(22) Filed: Apr. 26, 2010

(65) Prior Publication Data

US 2010/0270823 A1    Oct. 28, 2010

(30) Foreign Application Priority Data

Apr. 27, 2009    (JP) ................................. 2009-107919

(51) Int. Cl.
*B60N 2/04* (2006.01)
(52) U.S. Cl. .................. 296/65.09; 296/65.16; 297/337; 297/378.12
(58) Field of Classification Search ............... 296/65.08, 296/65.09, 65.05, 65.01, 65.16; 297/334, 297/378.12
See application file for complete search history.

(56) References Cited

U.S. PATENT DOCUMENTS

| 6,371,556 | B1 * | 4/2002 | Arai .............................. 297/331 |
| 6,588,823 | B1 * | 7/2003 | Carlsson et al. ............ 296/65.01 |
| 7,686,389 | B2 * | 3/2010 | Yamada .......................... 297/15 |
| 2008/0224518 | A1 | 9/2008 | Yamada et al. |
| 2010/0019526 | A1 | 1/2010 | Wada et al. |

FOREIGN PATENT DOCUMENTS

| JP | 2006-248330 | 9/2006 |
| WO | WO 2006/132018 A1 | 12/2006 |
| WO | WO 2008/102800 A1 | 8/2008 |

* cited by examiner

*Primary Examiner* — Joseph D Pape
(74) *Attorney, Agent, or Firm* — Oblon, Spivak, McClelland, Maier & Neustadt, L.L.P.

(57) ABSTRACT

A lock apparatus for a vehicle seat includes a protruding portion formed at the side of a seat cushion so as to protrude therefrom, the seat cushion being movable between a usable position and a retracted position, a guide wall member having a guide groove with which the protruding portion is engaged, a latch formed with an opening portion within which the protruding portion is engagable, a sliding member a sliding surface, a latch biasing member, a pawl, a cam surface formed at the pawl for rotating the latch so as to sandwich the protruding portion, a pawl biasing member, a releasing lever and a releasing member formed so as to protrude from the releasing lever in order to rotate the pawl by pressing a releasing portion in a direction against the biasing force applied to the pawl by the pawl biasing member.

6 Claims, 11 Drawing Sheets

Standby state before seat cushion locked

Transition to locked state

Start of unlocking seat cushion

Fully released point where seat cushion unlocked

Maximum misalignment at front

Maximum misalignment at rear

LOCK APPARATUS FOR VEHICLE SEAT

CROSS REFERENCE TO RELATED APPLICATIONS

This application is based on and claims priority under 35 U.S.C. §119 to Japanese Patent Application 2009-107919, filed on Apr. 27, 2009, the entire content of which is incorporated herein by reference.

TECHNICAL FIELD

This disclosure relates to a lock apparatus for fixing a vehicle seat to a vehicle.

BACKGROUND DISCUSSION

Generally, a vehicle seat is generally fixed to a vehicle in such a way that a striker is engaged with a lock mechanism, the striker being provided at one of the vehicle seat and the vehicle and the lock mechanism being provided at the other of the vehicle seat and the vehicle.

According to a lock apparatus disclosed in JP2006-248330A, as illustrated in FIG. 8 in the publication, the vehicle seat is fixed in such a way that a striker, provided at the vehicle, enters a striker insertion opening, formed at a base plate that is a component of a seat lock assembly provided at the side of the seat, and in this configuration the striker is held by a striker engagement opening of the latch. Because of the dimensional misalignment of each component of the seat lock assembly, an assembly position of the striker and an assembly position of the seat lock assembly may vary. Such misalignment may be offset in such a way that the latch is rotated in a direction where the striker is pressed to a bottom surface of the striker insertion opening by means of a lock guiding surface having an inclined surface at 6 degree formed at a plate and being normally biased by a spring in an anticlockwise direction.

According to the lock apparatus disclosed in JP2006-248330A, the plate is provided in order to offset the misalignment of the assembly position of each component, however, the number of parts may be increased because of such additional component, which leads to cost increase. Further, increase of the number of parts may cause further misalignment, accordingly the assembly positions of the striker and the seat lock assembly may further vary, and such misalignments may not be offset only by means of the plate.

A need thus exists for a lock apparatus for a vehicle seat, which is not susceptible to the drawback mentioned above.

SUMMARY OF THE INVENTION

According to an aspect of this disclosure, a lock apparatus for a vehicle seat includes a protruding portion formed at the side of a seat cushion so as to protrude therefrom, the seat cushion being movable between a usable position and a retracted position relative to a vehicle floor, a guide wall member adapted to be fixed at the vehicle floor and having a guide groove with which the protruding portion is engaged so that a moving path of the protruding portion is regulated between the usable position and the retracted position of the seat cushion, a latch formed with an opening portion within which the protruding portion is engagable or disengageable and supported by the guide wall member so as to be freely rotatable between a releasing position at which the protruding portion is not engaged with the opening portion and a locking position at which the protruding portion enters the opening portion so as not to be disengaged therefrom, a sliding member formed so as to protrude from the latch and having a sliding surface formed at an outer circumferential surface thereof, a latch biasing member for applying a biasing force to the latch so as to rotate in a direction from the releasing position to the locking position, a pawl freely rotatably supported at the guide wall member so as to face the sliding surface of the sliding member and arranged so as to be parallel to and distant from the latch in a width direction of the seat cushion, a cam surface formed at the pawl for rotating the latch so as to sandwich the protruding portion between an inner surface of the opening portion of the latch and an end surface of the guide groove at the side of the usable position in order to regulate the rotation of the latch toward the releasing position, a pawl biasing member applying a biasing force to the pawl so as to rotate in a direction in which the cam surface presses the sliding surface of the sliding member, a releasing lever freely rotatably supported at the guide wall member so as to be parallel to and distant from the pawl in the width direction of the seat cushion and a releasing member formed so as to protrude from the releasing lever in order to rotate the pawl by pressing a releasing portion formed at the pawl in a direction against the biasing force applied to the pawl by the pawl biasing member.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
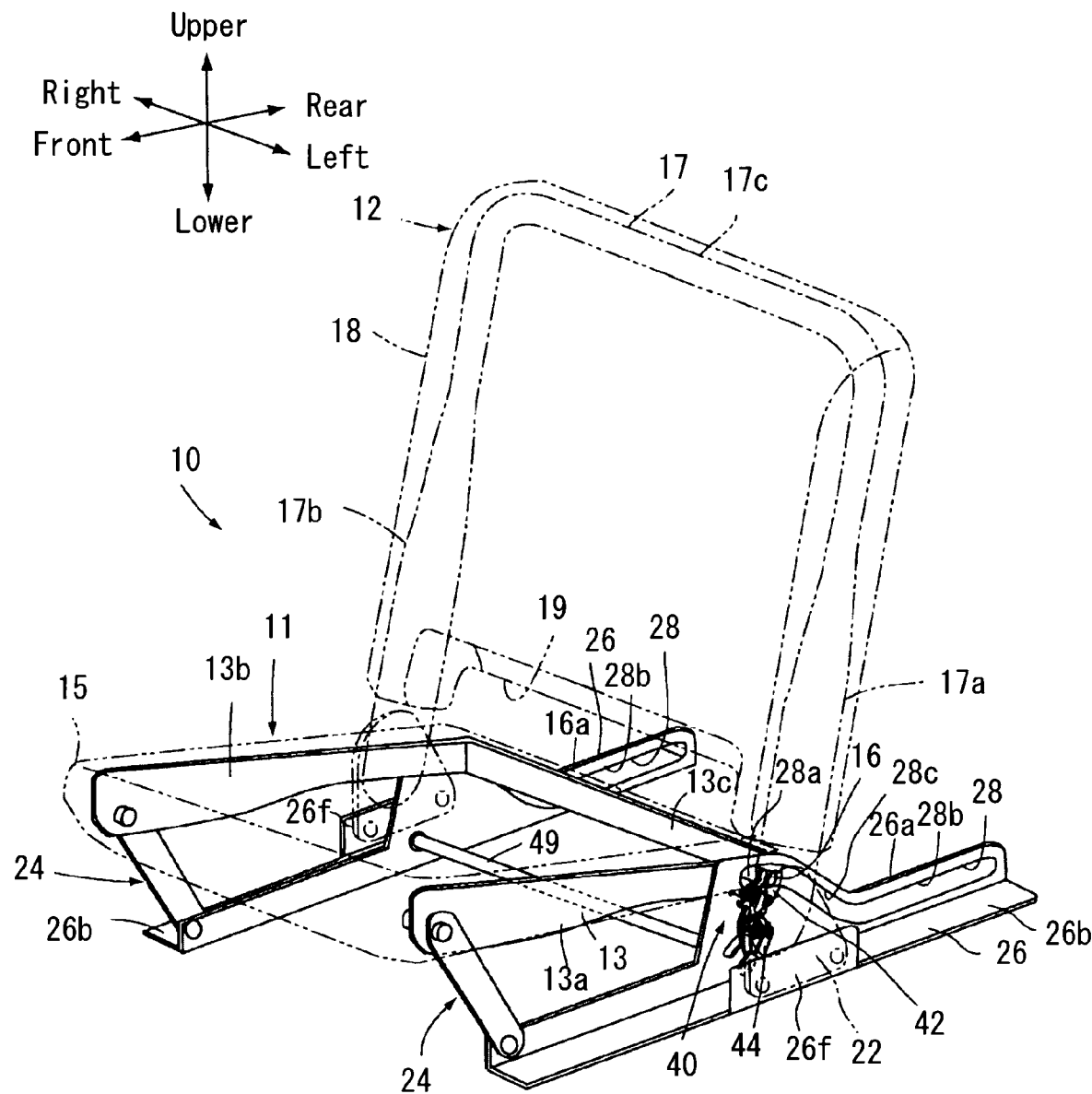
FIG. 1 is a perspective view illustrating a configuration of main parts of a vehicle seat whose seat cushion is at a usable position related to this disclosure.
Figure 2:
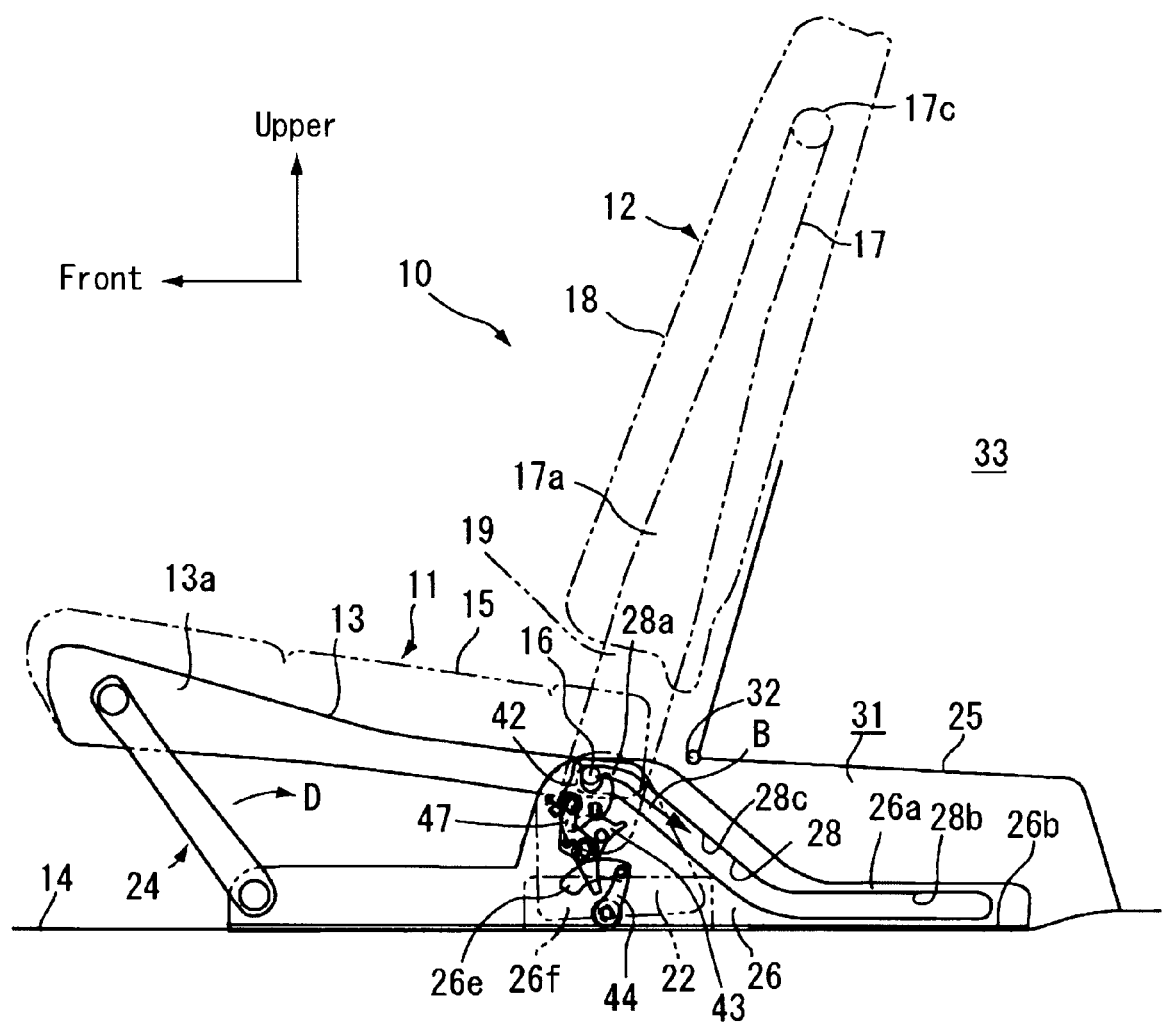
FIG. 2 is a side view illustrating the vehicle seat whose seat cushion is at the usable position related to this disclosure.
Figure 3:
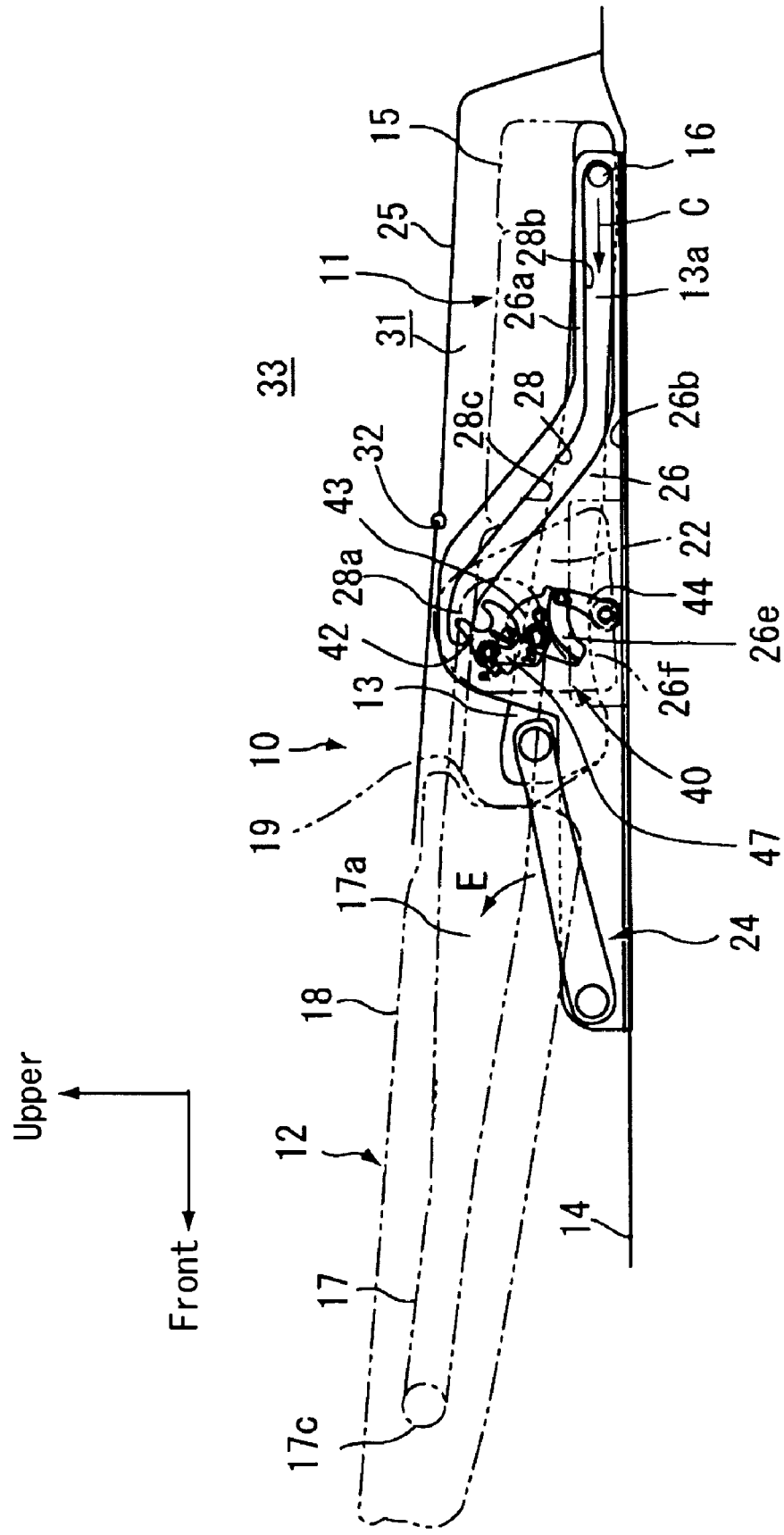
FIG. 3 is a side view illustrating the configuration of the main parts of the vehicle seat whose seat cushion is stored so as to be in a retracted position related to this disclosure.

An embodiment of a lock apparatus for a vehicle seat having a retractable seat cushion will be explained in accordance with the attached drawings. FIG. 1 is a perspective view illustrating a configuration of main components of a vehicle seat 10 whose seat cushion 11 is in a usable position. FIG. 2 is a side view illustrating the vehicle seat 10 whose seat cushion is in the usable position. FIG. 3 is a side view illustrating the vehicle seat 10 whose seat cushion 11 is stored so as to be in a retracted position.

The vehicle seat 10 is provided at a most rear seat of an automobile such as a van type automobile or a minivan, and as illustrated in FIGS. 2 and 3, the vehicle seat 10 is attached to a floor 14 (e.g., a vehicle body floor portion) formed in an entirely flat shape. In the embodiment, front, rear, right, left upper and lower directions of the vehicle seat 10 are identical to those of the vehicle, and the directions are indicated by arrows in the drawings.

The vehicle seat 10 includes the seat cushion 11 on which a passenger sits and a seat back 12 supporting a back portion of the passenger sitting on the seat cushion 11. The seat cushion 11 includes a cushion frame 13 having a left side arm 13a, a right side arm 13b, and a connecting portion 13c. The left side arm 13a is formed in a longitudinal plate shape and is attached to a left side of the seat cushion 11 in a seat width direction in a manner where, the left side arm 13a extends within the left side of the seat cushion 11 in a front-rear direction of the seat cushion 11, and a thickness direction of the left side arm 13a is approximately identical to the vehicle width direction. The right side arm 13b is also formed in a longitudinal plate shape and is attached to a right side of the seat cushion 11 in a seat width direction in a manner where, the right side arm 13b extends within the right side of the seat cushion 11 in the front-rear direction of the seat cushion 11, and a thickness direction of the right side arm 13b is approximately identical to the vehicle width direction. A rear end portion of the left side arm 13a is connected to a rear end portion of the right side arm 13b by means of the connecting portion 13c. In this configuration, the cushion frame 13 is formed in a squared C shape seen from the above thereof.

The cushion frame 13 is provided with a cushion pad that is formed so as to be elastically deformable and is attached to the cushion frame 13 by means of a cushion pan. A surface of the cushion pad is covered by a covering member 15.

The seat cushion 11 is mounted to the floor 14 by means of links 24 and rails 26 (e.g., a guiding member). The seat cushion 11 is movable between a usable position indicated in FIGS. 1 and 2 and a retracted position (a storing room 31 indicated in FIGS. 2 and 3). Specifically, the passenger may sit on the seat cushion 11 when the seat cushion 11 is in the usable position, and the storing room 31 is set below a deck board 25 forming a floor portion of a luggage room 33 at the rear of the usable position. The retracted position (storing room 31) is set lower than the usable position.

Each of the links 24 is made of a plate material and formed in a longitudinal shape. The link 24 is connected at a lower portion of the link 24 to the corresponding rail 26 so as to be freely rotatable and is connected to the corresponding side arm (the side arm 13a or 13b) so as to be freely rotatable at an upper portion of the link 24. A rotational shaft of one of the links 24 connected to the side arm 13a is connected to a rotational shaft of the other of the links 24 connected to the side arm 13b by means of a rod, thereby establishing a simultaneous rotation of the both of the links 24. When the seat cushion 11 is in the usable position, each link 24 is positioned so as to be upright between the seat cushion 11 and the floor 14 in order to support the seat cushion 11 so as to be in the usable position. Further, when the seat cushion 11 being in the usable position is moved to the retracted position, the links 24 are moved toward the rear of the vehicle together with the seat cushion 11 (rotated in a direction indicated by an arrow D in FIG. 2), thereby guiding a moving direction of a front end portion of the seat cushion 11.

Because the front end portion of the seat cushion 11 is moved so as to follow a rotation path of the link 24, as the links 24 are rotated toward the rear of the vehicle, the seat cushion 11 is moved so as to be close to the floor 14 (moved downwardly). When the links 24 are rotated rearward so as to be mostly close to the floor 14 as is the state indicated in FIG. 3, the seat cushion 11 is located to the retracted position as illustrated in FIG. 3.

On the other hand, the seat cushion 11 being in the retracted position is moved so as to be in the usable position in such a way that the links 24 are rotated towards the front of the vehicle (rotated in an arrow E direction in FIG. 3), thereby moving the front end portion of the seat cushion 11 upwardly. Then, the forward movement of the seat cushion 11 is stopped when the forward movement of the seat cushion 11 is regulated by guide grooves 28 formed on the rails 26, accordingly the seat cushion 11 is positioned at the usable position (the state indicated in FIGS. 1 and 2).

As mentioned above, the rails 26 are used for connecting the seat cushion 11 to the floor 14 and are provided in a manner where the right rail 26 extends from a right side of the storing room 31 toward a position where the right link 24 is provided, and the left rail 26 extends from a left side of the storing room 31 toward a position where the left link 24 is provided. Each rail 26 is formed with a plate shaped guide wall member 26a (e.g., one wall portion). The guide wall member 26a is formed in a longitudinal shape and is provided along the front-rear direction of the vehicle. Each of the guide wall members 26a is arranged so as to face a corresponding side of the seat cushion 11, when the seat cushion 11 is moved in the retracted position.

Each of the rails 26 is also formed with an attachment portion 26b formed so as to continuously extend from a lower end portion of the guide wall members 26a in the seat width direction opposite to the seat cushion 11. Each of the rails 26 is fixed to the floor 14 at the attachment portion 26b by means of a screw member.

The guide groove 28 (a longitudinal through hole) is formed so as to be cut out on each of the guide wall members 26a, and the guide groove 28 is formed with a mildly-sloped portion 28a, a horizontal portion 28b and a sloped portion 28c. Specifically, the mildly-sloped portion 28a is formed at an intermediate portion of the guide wall member 26a in a front-rear direction of the vehicle seat, the horizontal portion 28b is formed at an rear end portion of the guide wall member 26a, and the sloped portion 28c is formed between the mildly-sloped portion 28a and the horizontal portion 28b so as to connect each other. The horizontal portion 28b is formed so as to extend in a horizontal direction relative to the floor 14 in the vicinity of the floor 14, and the mildly-sloped portion 28a is set so as to be higher than the horizontal portion 28b with downwardly mildly-sloping relative to the floor 14 as it extends toward the rear of the vehicle. The sloped portion 28c is formed so as to slope downwardly relative to the floor 14 as it extends toward the rear of the vehicle. A protruding portion 16 functioning as a guide is provided at each of the right and left sides of the cushion frame and is inserted into the guide groove 28 of each of the guide wall members 26a so as to be relatively movable. The protruding portion 16 is formed in a circular cylinder shape and is provided at the rear end portion of the cushion frame 13 so as to protrude outwardly (see FIGS. 4 and 5). In this configuration, the rear end portion of the seat cushion 11 is indirectly connected to the floor 14 by means of each rail 26. The rear end portion of the seat cushion 11 is moved so as to be guided by the protruding portion 16 inserted into the guide groove 28 and is moving along thereof, thereby regulating a moving path of the seat cushion 11 between the usable position and the retracted position.

A lock apparatus 40 related to this disclosure is provided on a flat surface 26c of the guide wall member 26a, the flat surface 26c being formed at the intermediate position of the guide wall member 26a in the front-rear direction of the vehicle seat. In the embodiment, two lock apparatus 40 are provided to the right and left sides of the seat cushion 11, respectively. The lock apparatus 40 is a mechanism for fixing (e.g., holding) or releasing the protruding portion 16 of the seat cushion 11 and is provided below the mildly-sloped portion 28a of the guide groove 28 as illustrated in FIGS. 4 and 5.

Figure 4:
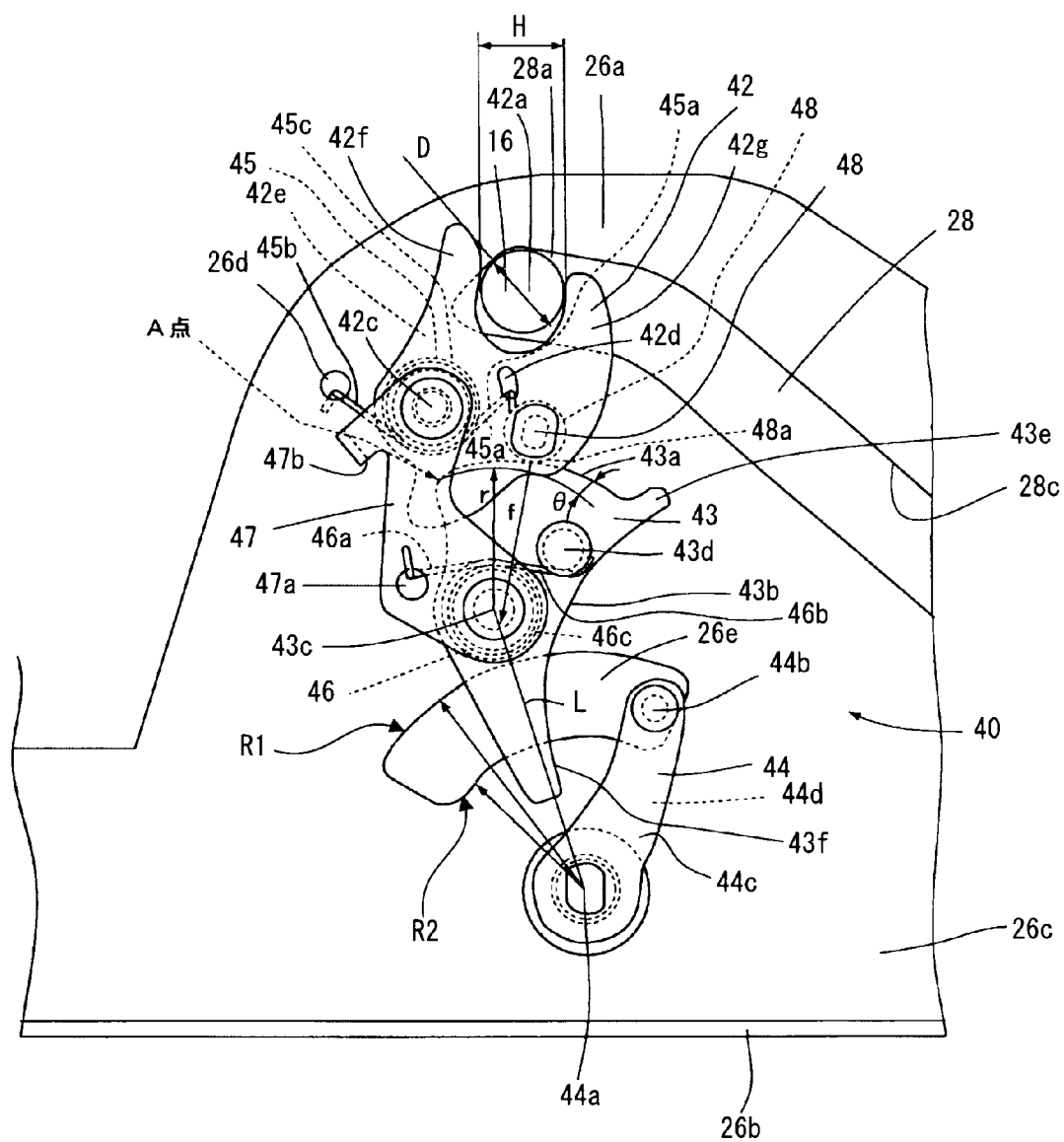
FIG. 4 is an enlarged view of a lock apparatus related to this disclosure.
Figure 5:
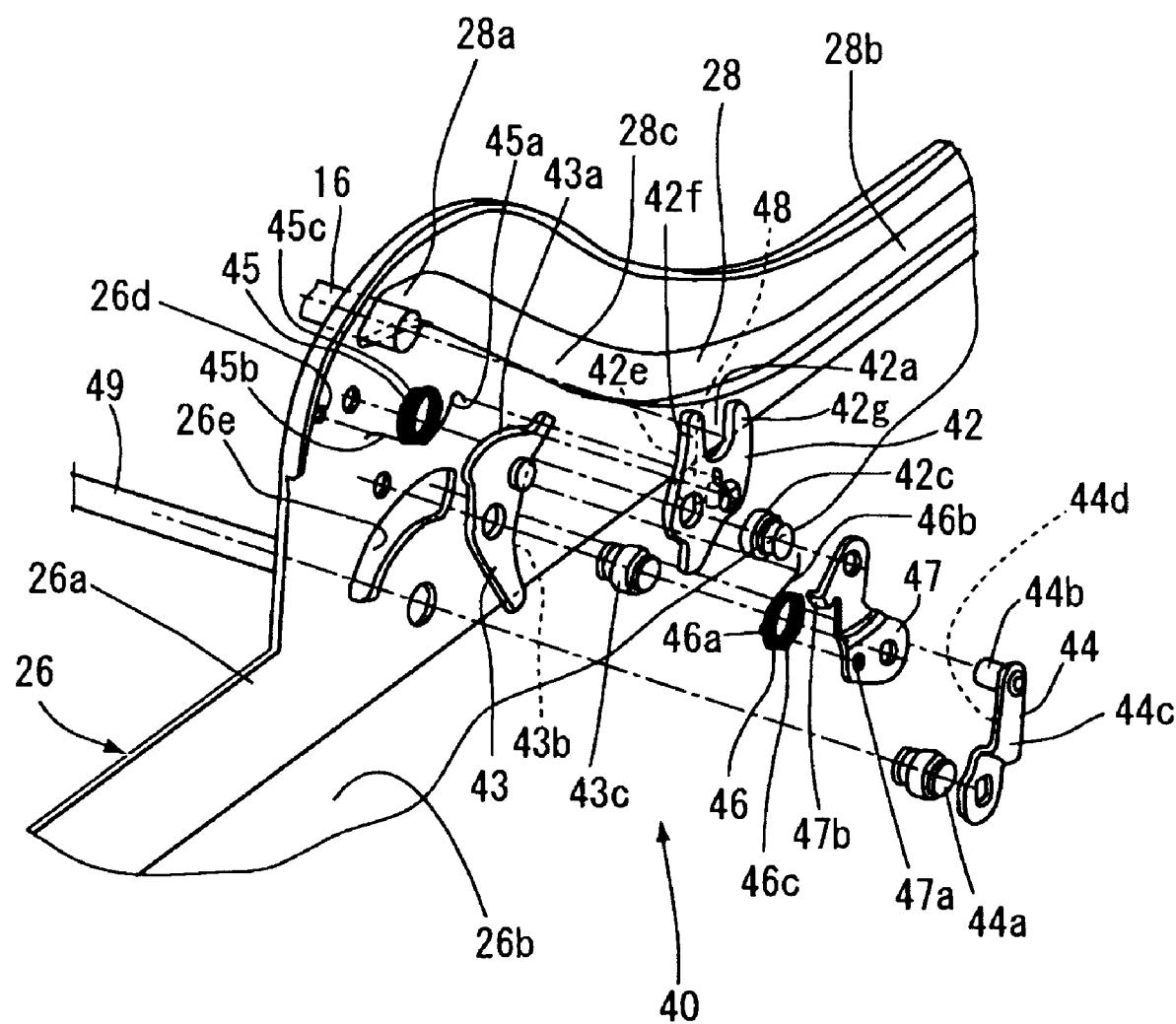
FIG. 5 is a perspective exploded view of the lock apparatus in FIG. 4.

As illustrated in FIGS. 4 and 5, the lock apparatus 40 includes a latch 42, a sliding pin 48 and a first torsion coil spring 45. The latch 42 is supported by a rotational shaft 42c on the flat surface 26c so as to be freely rotatable. The sliding pin 48, functioning as a sliding member, is formed so as to protrude from a flat surface 42e of the latch 42 toward the seat cushion 11. The sliding surface 48a is formed at a circumferential surface of the sliding pin 48. The first torsion coil spring 45 is a latch biasing member for applying a biasing force to the latch 42 so as to rotate a locking position being a the locking position to a releasing position (e.g., a clockwise direction in FIG. 4).

The lock apparatus 40 further includes a pawl 43, a cam surface 43a, a second torsion coil spring 46 and a concave surface 43b. The pawl 43 is provided at a rear and below the latch 42 and so as to be distant from the latch 42, supported to the flat surface 26c by means of a rotational shaft 42c so as to be freely rotatable toward the seat cushion 11 in a width direction of the seat cushion 11. The cam surface 43a is formed at a circumferential surface of the pawl 43, and the pawl 43 is arranged in such a way that the cam surface 43a faces, contacts and pushes the sliding surface 48a of the sliding pin 48. The second torsion coil spring 46 functions as a pawl biasing member for applying a biasing force to the pawl 43 so as to rotate in a direction where the cam surface 43a thereof presses the sliding surface 48a of the sliding pin 48. The concave surface 43b, functioning as a releasing portion, is formed at a thickness portion of the pawl 43 and is pressed by a releasing pin 44b formed at a releasing lever 44 when the protruding portion 16 is released (unlocked).

The lock apparatus 40 further includes the releasing lever 44, the releasing pin 44b and a connecting plate 47. The releasing lever 44 is arranged at a rear and below the pawl 43 and arranged so as to be distant from the seat cushion 11 in the width direction of the seat cushion 11. The releasing lever 44 is supported on the flat surface 26c by means of the rotational shaft 44a so as to be freely rotatable. The releasing pin 44b, serving as a releasing member, is formed so as to protrude from the flat surface 44d of the releasing lever 44 toward the seat cushion 11 and so as to face the concave surface 43b. The connecting plate 47 connects the rotational shaft 42c of the latch 42 to the rotational shaft 43c of the pawl 43 in order to reinforce the rotational shafts 42c and 43c.

According to the lock apparatus 40 in this configuration, the latch 42 is provided in such a way that the opening portion 42a thereof opens upwardly with which the protruding portion 16 is engaged, the pawl 43 is provided in such a way that the cam surface 43a thereof presses the sliding pin 48 provided at the latch 42, and the releasing lever 44 is provided in such a way that the releasing pin 44b presses the concave surface 43b formed at the pawl 43 in order to release (unlock) the protruding portion 16. The latch 42, the pawl 43 and the releasing lever 44 are arranged from top to bottom of the lock apparatus 40 in the mentioned order. The latch 42 and the pawl 43 are arranged in a manner where the latch 42 partially overlaps the pawl 43, and the releasing lever 44 is arranged so as to partially overlap the pawl 43 in a state where the releasing lever 44 is rotated upon a releasing operation.

The latch 42 is made of a plate material having rigidity such as an iron plate. The latch 42 is formed with the opening portion 42a with which the protruding portion 16 sliding within the guide groove 28 is engageable. The opening portion 42a is formed between latch protruding portions 42f and 42g, the latch protruding portion 42f being arranged in front of the opening portion 42a, and the latch protruding portion 42g being arranged at a rear of the opening portion 42a. The latch protruding portion 42f is formed so as to extend from the rotational shaft 42c of the latch 42 so as to be distant therefrom by a predetermined length. The latch protruding portion 42g is formed in such a way that the opening portion 42a is formed between the latch protruding portions 42f and 42g so as to have an approximate parallel portion H into which the protruding portion is inserted. The width of the parallel portion H is set so as to be slightly larger than a maximum diameter Dm of a diameter D of the protruding portion 16, so that the protruding portion 16 is surely engaged with the opening portion 42a. On an inner side of the flat surface 42e of the latch 42 at the side of the seat cushion 11, the sliding pin 48, serving as a sliding member, is provided at a predetermined position so as to protrude toward the seat cushion 11. A height of the sliding pin 48 is set so as to slightly exceed a height of the pawl 43 in an axial direction thereof in an assembled state, the pawl 43 being arranged so as to be distant from the latch 42 in the axial direction thereof. The sliding pin 48 is formed with the sliding surface 48a that is arranged so as to face the cam surface 43a of the pawl 43 and is pressed by the cam surface 43a of the pawl 43.

The first torsion coil spring 45 is provided at the latch 42 in such a way that the first torsion coil spring 45 is wounded around the rotational shaft 42c. The first torsion coil spring 45 is wound in a clockwise direction and extends in a direction orthogonal to FIG. 4. The first torsion coil spring 45 includes a coil 45c serving as a coil portion. The coil 45c includes a start portion and an end portion, and each of the start and end portions has engagement portions 45a and 45b at which the first torsion coil spring 45 is attached. The engagement portion 45a is formed so as to extend from a predetermined point of the start portion of the coil 45c in a tangential direction thereof and is engaged with an engaging hole 42d formed at the latch 42. The engagement portion 45b is formed so as to extend from a predetermined point of the end portion of the coil 45c in a tangential direction, and a bent end portion of the engagement portion 45b is engaged with an engaging hole 26d formed at the guide wall member 26a. In this configuration, the first torsion coil spring 45 biases the latch 42 so as to rotate relative to the rotational shaft 42c in the clockwise direction.

The pawl 43 is arranged between the latch 42 and the seat cushion 11 in the vehicle width direction so as to be parallel and distant from the latch 42 and closed to the seat cushion 11. A distance between the pawl 43 and the latch 42 may be set so as not to interrupt the pawl 43 and the latch 42 when they are rotated.

The pawl 43 is a member for transmitting a force to the latch 42 via the sliding surface 48a formed on the sliding pin 48. The pawl 43 is made of a plate material having rigidity such as an iron plate. The rotational shaft 43c by which the pawl 43 is freely rotatably supported is positioned at a rear and below the rotational shaft 42c of the latch 42.

The pawl 43 includes the cam surface 43a, the concave surface 43b and a protruding portion 43e. The cam surface 43a is a member transmitting a force via the sliding surface 48a of the sliding pin 48, the concave surface 43b is a releasing member for receiving a releasing force generated by the releasing lever 44 and is formed so as to have a predetermined curvature R, and the protruding portion 43e is formed so as to protrude from a rear end portion of the cam surface 43a.

The protruding portion 43e is a stopping portion at which the rotation of the pawl 43 is stopped in such a way that the protruding portion 43e engages the sliding pin 48 of the latch 42 when the pawl 43 is largely rotated in an anticlockwise direction as shown in FIG. 4. Each of the cam surface 43a and the concave surface 43b is formed at a circumferential surface of the pawl 43.

The cam surface 43a of the pawl 43 is set so as to form a predetermined angle θ (hereinafter referred to as a pressure angle) relative to a locus "r" drawn by a front end point A of the cam surface 43a when the pawl 43 is rotated relative to the rotational shaft 43c. The pressure angle θ is an angle that is set at the cam surface 43a in such a way that, when the cam surface 43a and the sliding pin 48 are pressing each other by receiving the biasing forces applied by the first and second torsion coil springs 45 and 46, respectively, a vector of a force "f" applied to the cam surface 43a by the sliding pin 48 of the latch 42 is usually set at the right of a straight line connecting the sliding surface 48a of the latch 42 and a rotational center of the pawl 43. Because of the cam surface 43a formed so as to have the pressure angle θ, the pawl 43 normally receives the biasing force by the latch 42 in the clockwise direction that is opposite to the direction of the biasing force applied by the second torsion coil spring 46. As a reaction force, the cam surface 43a biases the latch 42 in the anticlockwise direction that is opposite to the direction of the biasing force applied to the latch 42 by the first torsion coil spring 45. Accordingly, the latch 42 and the pawl 43 are normally pressing each other via the sliding pin 48 so that a misalignment may be absorbed.

At any rotational angle where the sliding pin 48 of the latch 42 and the cam surface 43a of the pawl 43 are contacting and pressing each other, a level of the force generated by the second torsion coil spring 46 for biasing the pawl 43 is set to be greater than a level of the force generated by the first torsion coil spring 45 biasing the latch 42. Accordingly, the latch 42 is pressed by the pawl 43 and biased in an anticlockwise direction until the sliding surface 48a of the sliding pin 48 reaches the front end point A that is an end point of the cam surface 43a, in other words, until immediately before the seat cushion 11 is unlocked.

Because of the concave surface 43b of the pawl 43, serving as a releasing portion, the pawl 43 rotates in a clockwise direction in such a way that the releasing pin 44b of the releasing lever 44 rotated relative to the rotational shaft 44a in an anticlockwise direction in FIG. 4 presses the concave surface 43b, thereby rotating the pawl 43 in the clockwise direction.

The concave surface 43b is formed at a lower-rear portion of the pawl 43 relative to the cam surface 43a so as to face the releasing pin 44b arranged behind the pawl 43 in FIG. 4. The concave surface 43b is formed so that, as the pawl 43 is rotated in a releasing direction (in a clockwise direction) by the releasing pin 44b pressing the pawl 43, the releasing pin 44b moves so as to pass a hypothetical straight line L from one side (e.g., a right side) in the vicinity of the hypothetical straight line L toward the other side (e.g., a left side) in the vicinity of the hypothetical straight line L, the hypothetical straight line L connecting a center point of the rotational shaft 44a of the releasing lever 44 and a center point of the rotational shaft 43c of the pawl 43. Because a rotational force of the releasing lever 44 and a rotational speed of the pawl 43 are determined on the basis of the shape of the concave surface 43b, the concave surface 43b may be formed so as to achieve any required conditions in addition to the aforementioned conditions such as the rotational force of the releasing lever 44 and the rotational speed of the pawl 43.

At one end of the concave surface 43b of the pawl 43, an end portion 43f is formed so as to be curved, the curve being set along a circle relative to a rotational shaft 44a of the releasing lever 44 having a radius identical to a length from the central point of the rotational shaft 44a to a contact point at which the releasing pin 44b contacts the concave surface 43b. Because of the end portion 43f formed at the end of the concave surface 43b, the releasing lever 44 may idly rotate, after the protruding portion 16 disengages from the latch 42, so that the pawl 43 may not perform an unnecessary rotation.

The second torsion coil spring 46, serving as a pawl biasing member, is provided at the pawl 43 in such a way that the second torsion coil spring 46 is wounded around the rotational shaft 43c.

The second torsion coil spring 46 is a torsion coil spring wounded in a clockwise direction so as to extend in a direction orthogonal to FIG. 4. As mentioned above, at any rotational angle where the sliding surface 48a of the sliding pin 48 of the latch 42 and the cam surface 43a of the pawl 43 are contacting and pressing each other, the level of the force generated by the second torsion coil spring 46 for biasing the pawl 43 is set to be greater than a level of the force generated by the first torsion coil spring 45 biasing the latch 42. More specifically, the second torsion coil spring 46 includes a coil 46c serving as a coil portion. The coil 46c includes a start portion and an end portion, and each of the start and end portions has an engagement portions 46a and 46b at which the second torsion coil spring 46 is attached. The engagement portion 46a is formed at the start portion of the coil 46c so as to extend in a tangential direction from a predetermined point of the start portion of the coil 46c and is engaged with an engaging hole 47a formed on the connecting plate 47 (described in detail below) at a bent portion formed at the engagement portion 46a. The engagement portion 46b is formed at the end portion of the coil 46c so as to extend in a tangential direction from a predetermined point of the end portion of the coil 46c and is engaged with a lower circumferential surface of a shaft portion of a hook pin 43d at an R-shaped portion formed at the end portion of the coil 46c. The hook pin 43d is formed on the flat surface of the pawl 43 so as to protrude in an opposite direction where the seat cushion 11 is provided. In this configuration, the second torsion coil spring 46 biases the pawl 43 so as to rotate relative to the rotational shaft 43c in an anticlockwise direction.

The releasing lever 44 is operated so as to rotate in an anticlockwise direction relative to the rotational shaft 44a by an external force applied by an operator by means of a predetermined method. The force applied by the operator to the releasing lever 44 is firstly transmitted to the pawl 43 (the concave surface 43b) and then transmitted to the latch 42 so as to be rotated in the clockwise direction in order to release the lock state of the seat cushion 11.

The releasing lever 44 is axially supported at the flat surface 26c of the guide wall member 26a by the rotational shaft 44a at both sides (right and left sides) of the seat cushion 11, and the rotational shaft 44a provided at the right side of the seat cushion 11 is connected to the rotational shaft 44a provided at the left side of the seat cushion 11 by means of a rod 49. In this configuration, each of the rotational shafts 44a and each of the releasing levers 44, which are provided at each side (right or left side) of the seat cushion 11, respectively, are simultaneously rotated by operating either one of the releasing levers 44. The releasing levers 44 may alternatively be attached to the guide wall members 26 by means of the rod 49 provided so as to penetrate through the guide wall members 26, respectively, and the releasing lever 44 provided at the right side of the seat cushion 11 is connected to the releasing lever 44 provided at the left side of the seat cushion by means of the rod 49.

The releasing lever 44 is formed so as to include the releasing pin 44b serving as a releasing member, and a main body portion 44c, and the releasing pin 44b is formed so as to protrude from the flat surface portion 44d of the main body portion 44c toward the seat cushion 11. The releasing lever 44 is biased by means of a biasing member in a clockwise direction as shown in FIG. 4.

A through hole 26e formed at the guide wall member 26a is provided in order to prevent an interference between the releasing pin 44b and the guide wall member 26a while the releasing lever 44 is rotated relative to the rotational shaft 44a. The through hole 26e is formed so as to be defined by an arc R1 and an arc R2, each of which are formed relative to the rotational shaft 44a, and two straight lines, one of the straight lines connecting one end of the arc R1 to one end of the arc R2, and the other of the straight lines connecting the other end of the arc R1 to the other of the arc R2. The arc R1 is formed at a radially outer portion of the arc R2 by a predetermined length relative to the rotational shaft 44a so that the releasing pin 44b may perform a smooth pivotal movement within the through hole 26e. An end surface of each end of the through hole 26e corresponding to the abovementioned straight lines functions as a stopper at which the releasing pin 44b of the releasing lever 44 contacts so as not to perform further pivotal movement. Therefore, the position of the end surfaces of the through hole 26e may be set at positions corresponding to a fully opening position and a fully closed position of the releasing lever 44, respectively. In a case where the releasing pin 44b is provided without any interference with the guide wall member 26a, the through hole 26e may not be formed on the guide wall member 26a, and members functioning as stopping portion for regulating the fully opened and closed positions of the releasing lever 44 may alternatively be provided.

The rail 26 is provided with a connecting piece 26f formed so as not to interfere with the lock apparatus 40. Specifically, the connecting piece 26f is formed in a plate shape and is arranged at a central portion in a longitudinal direction of the fixing piece 26b so as to extend upwardly from an end portion opposite to the guide wall member 26a. In this configuration, a connecting plate 22 (e.g., the other wall portion, a guiding member) formed in a plate shape is fixed to each of the connecting pieces 26f by a screwing means in a manner where a lower end portion of the connecting plate 22 overlaps the connecting piece 26f in a thickness direction thereof. The connecting plates 22 are used for supporting the seat back 12 to the floor 14 and are arranged so as to face the guide wall member 26a (e.g., one wall portion) in a right-left direction of the vehicle seat 10, respectively.

The seat back 12 includes a back frame 17 serving as a bone structure member of the seat back 12. The back frame 17 is formed in a squared C when viewed from in a front view with plate shaped side portions 17a and 17b and a pipe shaped upper portion 17c. Each side portion 17a and 17b is formed in a plate shape and is provided within side portions of the seat back 12 so as to extend upwardly in a height direction of the seat back 12. The pipe shaped upper portion 17c is arranged at an upper portion of the seat back 12 so as to extend in the width direction of the seat back 12 in order to connect the side portion 17a to the side portion 17b.

An elastically deformable back pad is attached to the back frame 17 with a back mattress, and a surface of the back pad is covered by a covering member 18. A recess 19 is formed at a lower portion of the back pad so that the seat cushion 11 may not interfere with the seat back 12 during a time period where the seat cushion 11 being in the usable position is moved so as to be in the retracted position.

Each of the lower end portion of the side portions 17a and 17b of the back frame 17 is arranged between the connecting plate 22 and the guide wall member 26a at right and left sides of the seat back 12 respectively. The lower end portions of the side portions 17a and 17b are rotatably connected to the connecting plates 22, respectively, by means of a supporting shaft. A known reclining mechanism is arranged between one of the side portions (e.g., the side portion 17a) and the corresponding connecting plate 22, and the back frame 17 (the seat back 12) is supported to the connecting plate 22 via the reclining mechanism. The reclining mechanism is provided with a lever that is operated by the operator in order to allow a pivotal rotation of the back frame 17 (the seat back 12) relative to the floor 14.

The seat back 12 in this configuration is pivotally movable between an upright position and a folded position. When the seat back 12 is in the upright position (in the state shown in FIG. 1), the back portion of the passenger sitting on the seat cushion 11 being in the usable position is supported by the seat back 12, and when the seat back 12 is in the folded position (in the state shown in FIG. 3), the seat back 12 is located anteriorly to and aligned with the seat cushion 11 being in the retracted position.

Next, an actuation of the lock apparatus related to the embodiment will be described. A sequential operation, in which the seat cushion 11 being in the retracted position is operated so as to be moved forward in a front-rear direction of the vehicle so as to be in the usable position, and the protruding portion 16 provided at the seat cushion 11 is locked by means of the lock apparatus 40, will be explained in accordance with the attached drawings.

Figure 6:
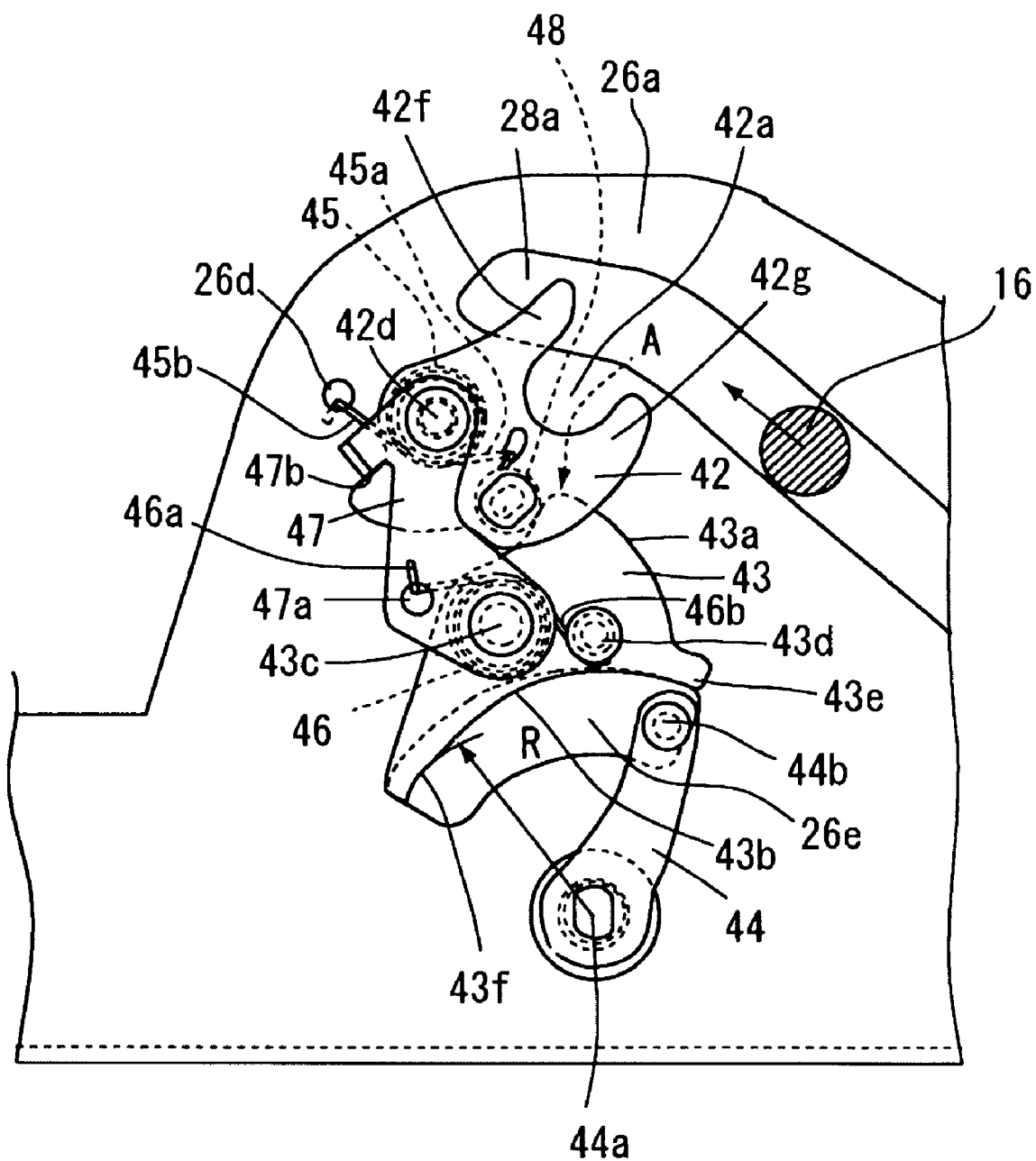
FIG. 6 is a diagram indicating the lock apparatus being in a standby state before the seat cushion is locked.
Figure 7:
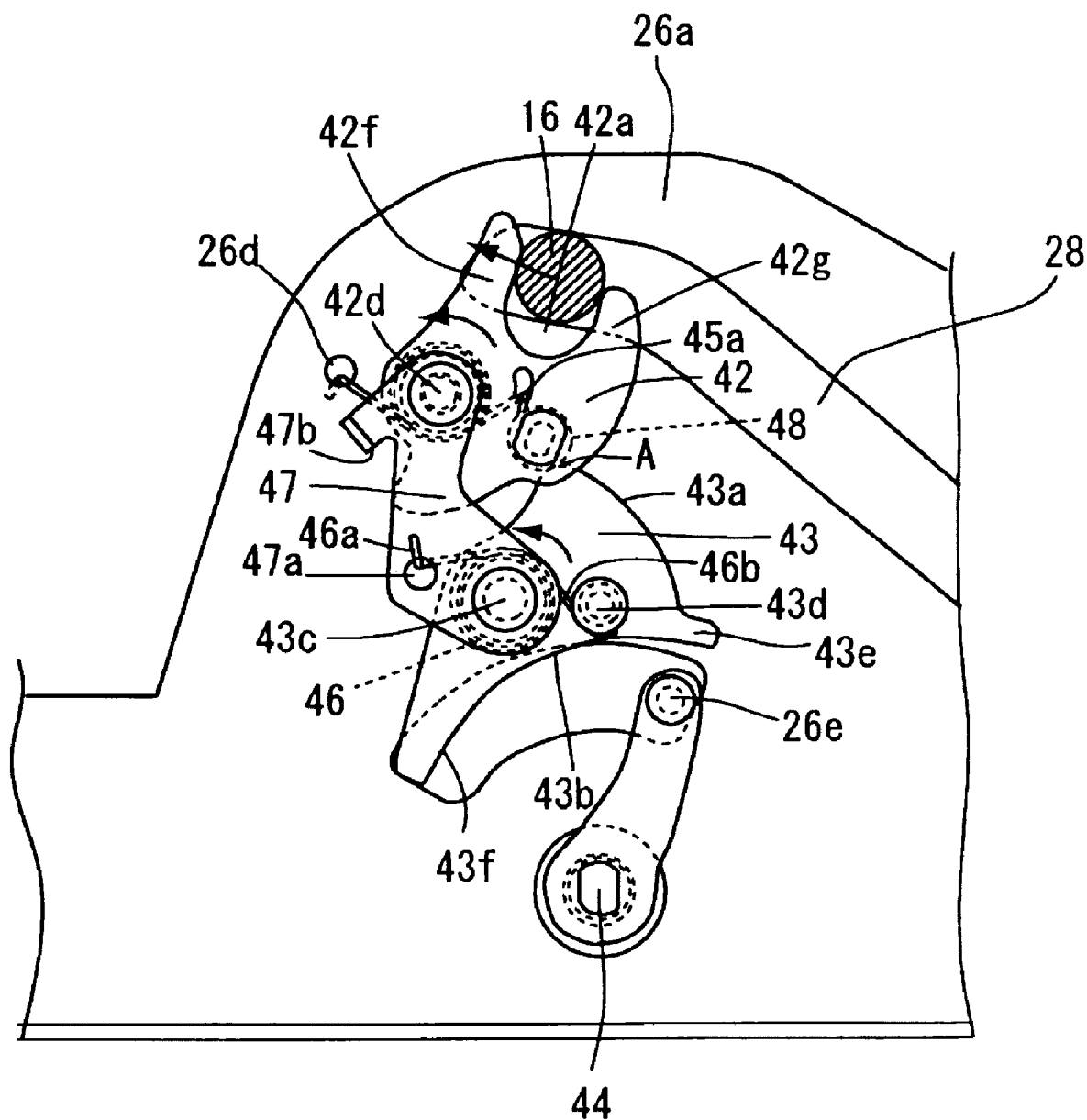
FIG. 7 is a diagram indicating the lock apparatus in a transition to the locked state of the seat cushion.

When the vehicle seat 10 having the abovementioned configuration is operated in such a way that the seat cushion 11 being in the retracted position is moved forward (moved in a direction indicated by an arrow C in FIG. 3), the protruding portion 16 is moved forward within the guide groove 28 formed at the guide wall member 26a so as to be guided thereby. At this point, as illustrated in FIG. 6 where the seat cushion 11 being in the retracted position is operated so as to be in the locked state (a lock standby state), the latch 42 forming the lock apparatus 40 is in a releasing state (e.g., the releasing position) in which the protruding portion 16 is not inserted into the opening portion 42a of the latch 42. The sliding pin 48 formed so as to protrude from the latch 42 is disengaged from the cam surface 43a of the pawl 43 that is located so as to be parallel to and distant from the latch 42 toward the seat cushion 11 in the width direction of the seat cushion 11. In this configuration, the latch 42 is rotated in the clockwise direction by receiving only a biasing force of the first torsion coil spring 45. The biasing force acts on the latch 42 in such a way that the stopping portion of the latch 42 presses the stopping portion 47b of the connecting plate 47 so that the rotation of the latch 42 is stopped. At this point, the latch 42 is positioned in a manner where the opening portion 42a thereof opens toward the mildly-sloped portion 28a of the guide groove 28. Once the protruding portion 16 of the seat cushion 11 slides so as to enter the mildly-sloped portion 28a of the guide groove 28 after passing through the sloped portion 28c of the guide groove 28, as illustrated in FIG. 7, the protruding portion 16 is engaged with the opening portion 42a of the latch 42 and is further moved by pressing the inner surface of the front portion of the opening portion 42a (e.g., the rear surface of the latch protruding portion 420, thereby rotating the latch 42 in an anticlockwise direction against the biasing force applied by the first torsion coil spring 45. As the latch 42 rotates in the anticlockwise direction, the sliding pin 48 formed so as to protrude on the latch 42 comes in contact with the cam surface 43a of the pawl 43 being in a standby state and then the sliding pin 48 is arranged above the cam surface 43a. At this point, the latch 42 is pressed by the cam surface 43a so as to be rotated in the anticlockwise direction, the cam surface 43a having the aforementioned pressure angle and receiving the biasing force by the second torsion coil spring 46 whose biasing force is set to be greater than the biasing force applied by the first torsion coil spring 45 to the latch 42.

The latch 42, rotated in the anticlockwise direction by receiving pressures of the cam surface 43a, presses forward the protruding portion 16 engaging with the latch 42 at a rear-inner surface of the opening portion 42a of the latch 42 (at a front surface of the latch protruding portion 42g). Accordingly, in accordance with the rotation of the latch 42 in the anticlockwise direction, the protruding portion 16 contacts an end surface of the mildly-sloped portion 28a of the guide groove 28, and the position of the protruding portion 16 is maintained between the end surface of the guide groove 28 and the rear-inner surface of the opening portion 42a of the latch 42 in order to firmly maintain the seat cushion 11 in the usable position. At this point, because the releasing lever 44 is biased in the clockwise direction by a biasing means, the releasing pin 44b moves so as to press one end surface of the through hole 26e, accordingly the releasing lever 44 remains stationary in a manner where the releasing pin 44b is distant from the concave surface 43b of the pawl 43.

Figure 10:
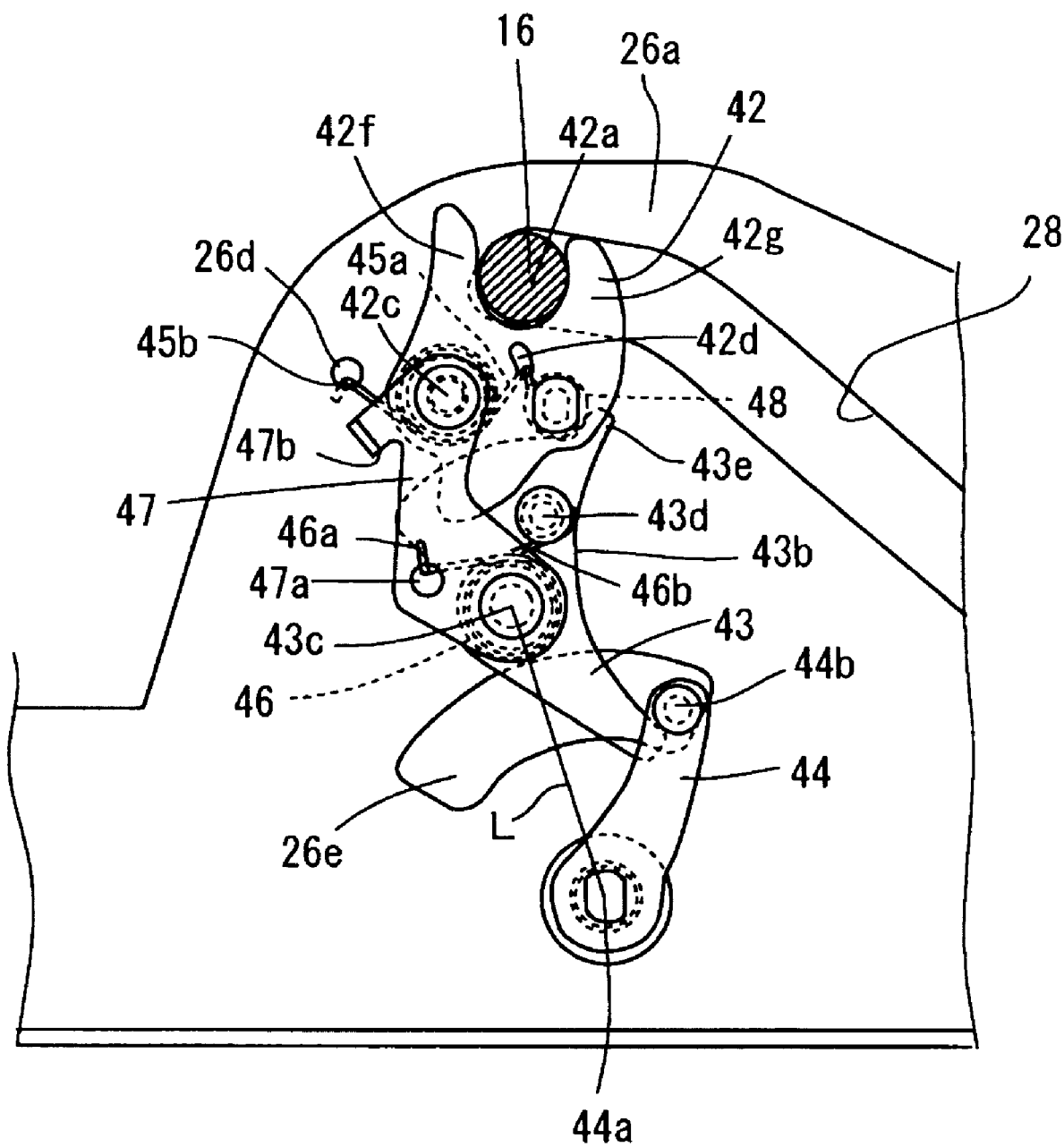
FIG. 10 illustrates a diagram indicating the lock apparatus in which a maximum misalignment occurs at a front portion of the lock apparatus.
Figure 11:
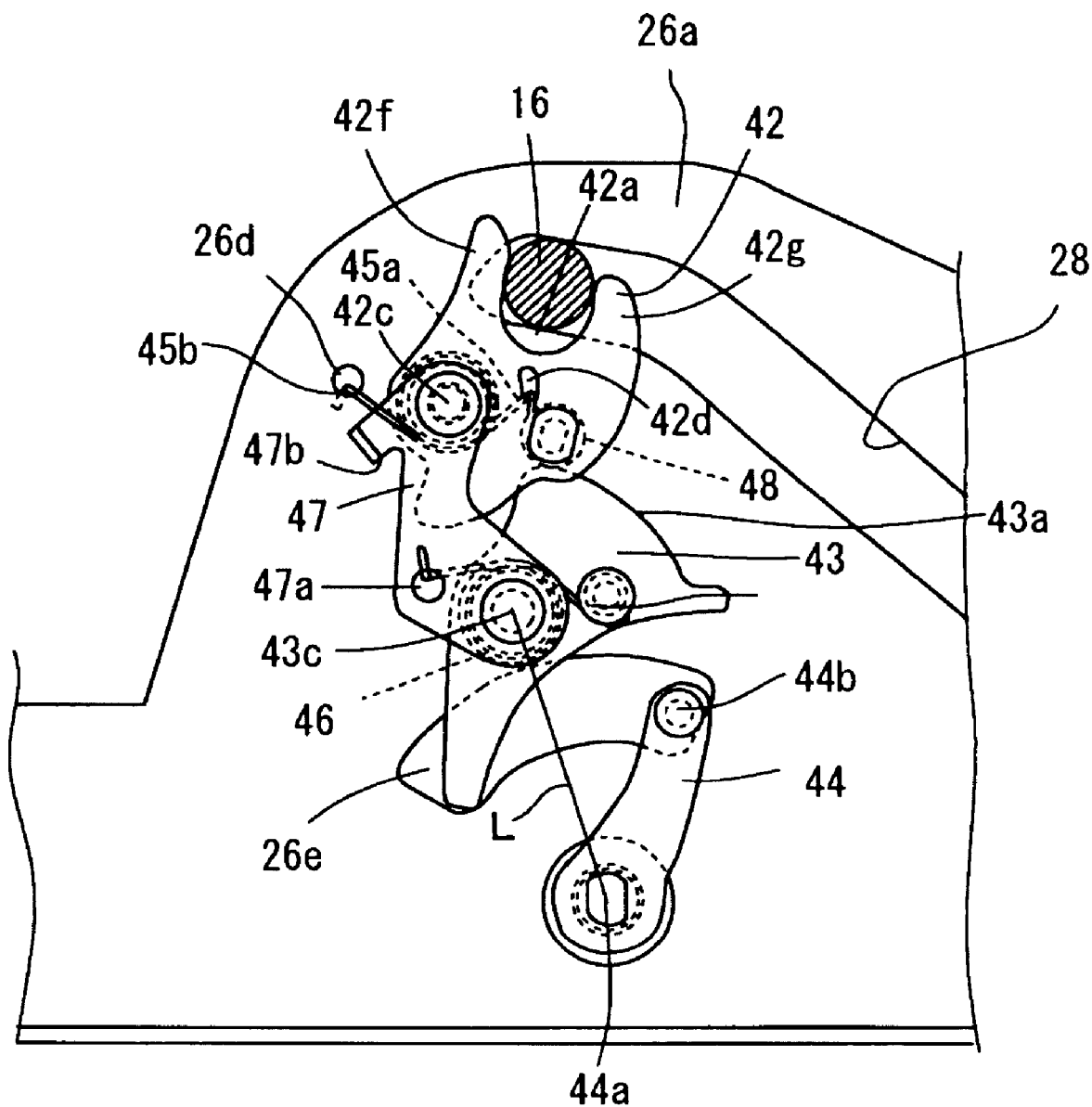
FIG. 11 illustrates a diagram indicating the lock apparatus in which a maximum misalignment occurs at a rear portion of the lock apparatus.

The position where the protruding portion 16 is maintained is determined on the basis of a position where the end surface of the mildly-sloped portion 28a of the guide groove 28 is formed, a diameter of the protruding portion 16, a position of the opening portion 42a when the latch 42 is attached to the rotational shaft, a shape of the latch 42, and the like. Because the mildly-sloped portion 28a and the position of the opening portion 42a when the latch 42 is attached to the rotational shaft are set on the guide wall member 26a being formed in a longitudinal shape and in a large size, the above-mentioned positions may vary. In view of those misalignments, such as the misalignment of the shape and the misalignment of the attachment of each part, FIG. 10 indicates a state in which a level of the misalignments becomes a maximum value (most significant) in a case where the protruding portion 16 is moved so as to be positioned at a most forward portion of the mildly-sloped portion 28a. Similarly, FIG. 11 indicates a state in which a level of the misalignments a maximum value (most significant) in a case where the protruding portion 16 is moved so as to be positioned at a most rear portion within the mildly-sloped portion 28a. Compared to FIG. 4 in which each component is formed in a median value, the seat apparatus indicated in FIGS. 10 and 11 is largely different in view of a position of the protruding portion 16, a rotatable angle of the latch 42 and a rotatable angle of the pawl 43. According to the seat apparatus in this disclosure, the latch 42 and the pawl 43 are arranged in parallel to each other having a distance therebetween in such a way that the sliding surface 48a of the sliding pin 48 protrudingly formed on the latch 42 faces the cam surface 43a of the pawl 43. In this configuration, even when a misalignment (e.g., a misalignment) is generated between the protruding portion 16 and the opening portion 42a of the latch 42, a relative movement between the sliding surface 48a of the sliding pin 48 of the latch 42 and the cam surface 43a formed so as to have a self-lockable pressure angle may preferably be performed, accordingly, in the configurations indicated in FIGS. 10 and 11, the misalignments may preferably be offset by the rotation of the latch 42.

An actuation where the seat cushion 11 being in a locked state at the usable position by means of the lock apparatus 40 is unlocked will be explained on the basis of the attached drawings. The seat cushion 11, being in the locked state in such a way that the protruding portion 16 maintained between the rear-inner surface of the opening portion 42a of the latch 42 (the front surface of the latch protruding portion 42g) and the end surface of the mildly-sloped portion 28a is released by an operator rotating the releasing lever 44 in the anticlockwise direction by a predetermined means.

Figure 8:
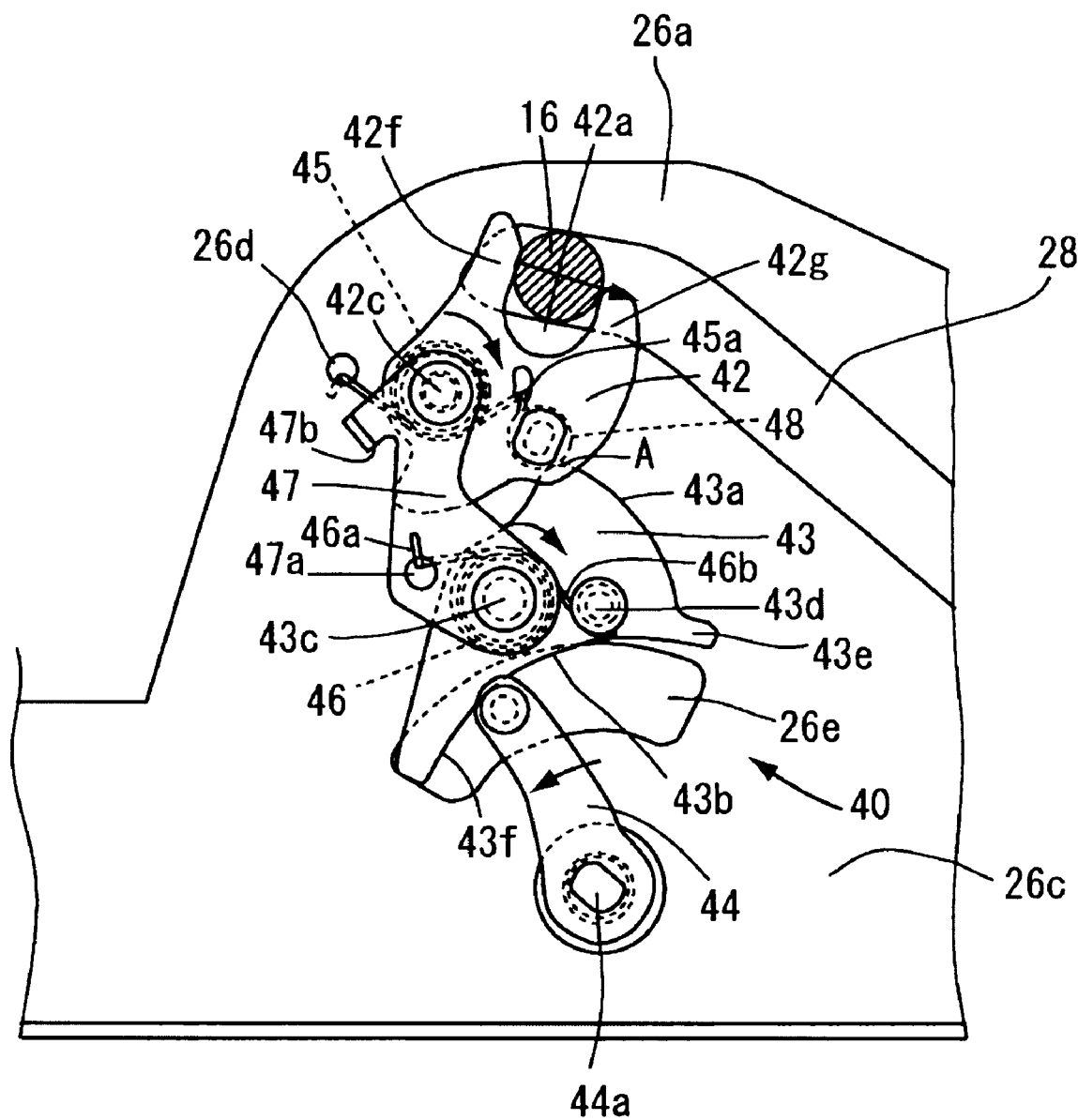
FIG. 8 is a diagram indicating the lock apparatus at a point where the unlock of the seat cushion is started.
Figure 9:
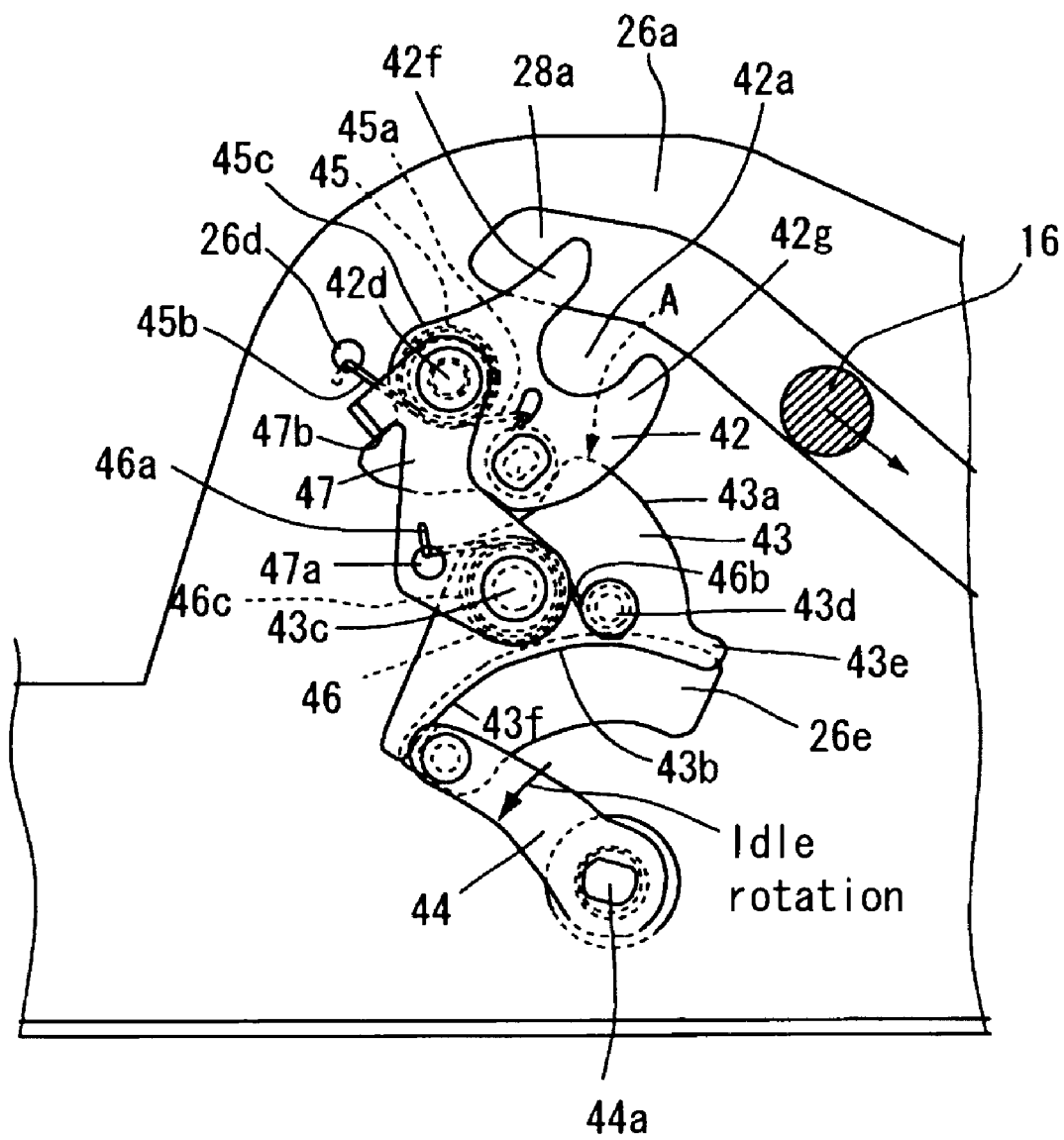
FIG. 9 is a diagram indicating the lock apparatus at a fully released point where the seat cushion is unlocked.

When the releasing lever 44 is rotated in the anticlockwise direction (in a direction indicated by an arrow in FIG. 8) in order to unlock the seat cushion 11, the releasing pin 44b formed so as to protrude from the releasing lever 44 comes into contact with the concave surface 43b having a radius R formed on the pawl 43. Then, as the releasing lever 44 is further rotated, the releasing pin 44b on the releasing lever 44 presses the concave surface 43b so that the pawl 43 is rotated in the clockwise direction (in a direction indicated by an arrow in FIG. 8). Then, once the sliding pin 48 of the latch 42 passes a point of the front end portion A of the cam surface 43a of the pawl 43, the sliding pin 48 disengages the cam surface 43a so as to be positioned along the side of the pawl 43. Accordingly, the latch 42 is released from the pressure generated by means of the cam surface 43a. Then, the latch 42 is rotated in the clockwise direction (the direction indicated by an arrow in FIG. 8) by means of the first torsion coil spring 45 for biasing the latch 42. Then, the opening portion 42a faces the guide groove 28 so that the protruding portion 16 is released to the guide groove 28, thereby unlocking the seat cushion 11. At this point, the latch 42 is maintained still by receiving the biasing force of the first torsion coils spring 45 in such a way that a portion of the latch 42 presses the stopping portion 47b of the connecting plate 47.

The end portion 43f of the concave surface 43b of the pawl 43, with which the releasing pin 44b comes in contact, after the cam surface 43a of the pawl 43 disengages the sliding pin 48 of the latch 42, is formed in a curved shape that is defined by a circular path drawn by a point at which the releasing pin 44b contacts the concave surface 43b relative to a central point of the rotational shaft 44a of the releasing lever 44. Accordingly, at this point, even when the releasing lever 44 is rotated, the releasing lever 44 idly rotates on the concave surface 43b of the releasing lever 44, thereby not rotating the pawl 42. In this configuration, the pawl 43 is not unnecessarily rotated because of the end portion 43f of the concave surface 43b, accordingly a level of the stress applied by the second torsion coil spring 46 for biasing the pawl 43 is reduced. At this point, the latch 42 is maintained still by receiving a pressure from the stopping portion 47b of the connecting plate 47 at a portion of the latch 42. The pawl 43 is slightly rotated and is maintained still by contacting to the sliding pin 48 of the latch 42. In this state, the releasing lever 44 is biased in the clockwise direction by means of a biasing member so as to be returned in the initial position, and the releasing pin 44b is maintained still by receiving a pressure from the straight portion of the rear end of the through hole 26e.

As mentioned above, positional misalignments may occur when the lock apparatus 40 is assembled (see FIGS. 10 and 11), however, according to this disclosure, in an initial assembling position of the releasing lever 44, the releasing lever 44 is positioned rear relative to a hypothetical straight line L connecting the central point of the rotational shaft 44a (e.g., a rotational center) of the releasing lever 44 and a central point of the rotational shaft 43c (e.g., a rotational center) of the pawl 43 (right side in FIG. 10). The concave surface 43b is formed in such a way that, as the releasing lever 44 is rotated in the anticlockwise direction and the releasing pin 44b is moved forward so as to pass the hypothetical straight line L, the releasing pin 44b contacts the concave surface 43b of the pawl 43 in order to rotate pawl 43, and the releasing pin 44b reaches a front side relative to the hypothetical straight line L (the left side in FIG. 10). In the vicinity of the hypothetical straight line L, a rotational angle of the pawl 43 relative to a rotational angle of the releasing pin 44b may be set most efficiently. According to this disclosure, because the rotational range of the releasing lever 44 is secured in the vicinity of the hypothetical straight line L where the pawl 43 is rotated efficiently, the misalignments of the assembling position of the pawl 43 may be offset by the releasing lever 44, accordingly, the pawl 43 may sufficiently be rotated even when the lock apparatus 40 is assembled as illustrated in the examples in FIGS. 10 and 11.

According to this disclosure, the sliding surface is not formed at a front of the front end point A of the cam surface 43a of the pawl 43 so that the sliding pin 48 of the latch 42 disengages the cam surface 43a. However, the sliding surface having a predetermined radius R may alternatively be formed at the front of the front end point A of the cam surface 43a in such a way that the sliding pin 48 of the latch 42 is not pressed by the sliding surface having a predetermined radius R.

According to this disclosure, the lock apparatus 40 includes the pawl 43 being arranged so as to be distant from the latch 42 in a width direction of the seat cushion 11 and so as to face the sliding surface 48a of the sliding pin 48 protrudingly formed at the latch 42. In this configuration, because the pawl 43 does not interfere with the latch 42, the sliding surface 48a may move within a large range relative to the cam surface 43a. In this configuration, according to the retraceable seat: in which the seat cushion 11 is moved between the usable position and the retracted position while the protruding portion 16 formed at the seat cushion 11 engages the guide groove 28 formed at the guide wall member 26a, or the protruding portion 16 of the seat cushion 11 is locked in the usable position by means of the lock apparatus 40; the shape and the position of the guide groove 28 formed in a longitudinal shape on the large sized guide wall member 26a, the shapes and positions of the latch 42, the pawl 43 and the releasing lever 44 may largely be out of alignment. Due to such misalignments, the position at which the protruding portion 16 is maintained between the end surface of the guide groove 28 and the inner surface of the opening portion 42a of the latch 42 may vary. However, according to this disclosure, because of the relative rotation (e.g., the relative movement) between the sliding surface 48a of the sliding pin 48 of the latch 42 and the cam surface 43a of the pawl 43 within the large area, the misalignments may sufficiently be offset by rotating the latch 42. Further, the releasing pin 44b, serving as the releasing member and protrudingly formed on the releasing lever 44, is provided in order to unlock (e.g., release) the protruding portion 16 by pressing the concave surface 43b, serving as the releasing portion, being formed on the pawl 43 that is arranged so as to be distant from the releasing lever 44 in the width direction of the seat cushion 11. Accordingly, the releasing lever 44 is actuated so as not to interfere with the pawl 43, and the releasing pin 44b may rotate relative to the concave surface 43b within a large area. Thus, because the misalignments may be offset in this simple configuration, an additional part such as a plate for eliminating a misalignment, such as the plate explained in the background of this disclosure, may not be provided in order to offset the misalignments, thereby reducing assembly costs and reducing further misalignments caused by increased parts.

According to the embodiment, the protruding portion 16 is arranged at the top portion of the lock apparatus 40, and the latch 42, the pawl 43 and the releasing lever 44 are arranged below the protruding portion 16 in the mentioned order in a manner where the latch 42 partially overlaps the pawl 43, and the releasing lever 44 partially overlaps the pawl 43 when the releasing lever 44 is rotated upon a releasing operation. In this configuration, the protruding portion 16 is sandwitchingly supported from below thereof by the latch 42, thereby downsizing an upper portion of the lock apparatus 40 relative to the protruding portion 16. This configuration may be a sufficient advantage for an assembling design of the lock apparatus 40 mounted to the vehicle seat 10 in which an enough space is not provided above the guide groove 28 used for guiding the protruding portion 16 provided at the seat cushion 11. In addition, because the latch 42, the pawl 43 and the releasing lever 44 are arranged in a manner where the latch 42 partially overlaps the pawl 43, and the releasing lever 44 partially overlaps the pawl 43 when the releasing lever 44 is rotated upon a releasing operation, the lock apparatus 40 having the abovementioned configuration may be mounted to a range that is relatively narrow in an upper-lower direction of the vehicle, thereby achieving a space downsizing.

According to the embodiment, when the releasing lever 44 is rotated so that the releasing pin 44b presses the concave surface 43b so as to rotate the pawl 43 in the releasing direction in order to release the protruding portion 16, the releasing pin 44b of the releasing lever 44 is moved from one side in the vicinity of the hypothetical straight line L to the other side in the vicinity of the hypothetical straight line L, the hypothetical straight line L connecting the central point of the rotational shaft 44a of the releasing lever 44 and the central point of the rotational shaft 43c of the pawl 43. In the vicinity of the hypothetical straight line L, a rotational angle of the pawl 43 relative to a rotational angle of the releasing pin 44b may be set most efficiently. According to this disclosure, because the rotational range of the releasing lever 44 is secured in the vicinity of the hypothetical straight line L at both sides thereof where the pawl 43 is rotated efficiently, the releasing lever 44 may be operated so as to sufficiently rotate the pawl 43 while the misalignment of the pawl 43 is sufficiently offset.

Further, the end portion 43f of the concave surface 43b of the pawl 43 is formed in a curved shape having a radius that is identical to a line connecting the releasing pin 44b to the rotational center of the releasing lever 44. Accordingly, even when the releasing lever 44 is rotated, the releasing lever 44 idly rotates after the cam surface 43a of the pawl 43 disengages the sliding surface 48a of the sliding pin 48, thereby not rotating the pawl 43. In this configuration, the pawl 43 may be in the standby state at a predetermined position without being unnecessarily rotated; at the same time a level of the stress applied to the pawl 43 by the second torsion coil spring 46 may be reduced.

Furthermore, according to the disclosure, the rotational center of the pawl 43 and the rotational center of the latch 42 are connected by means of the connecting plate 47 in order to reinforce the connection therebetween. In this configuration, according to the vehicle having the retractable seat cushion 11, even when a large amount of load is applied to the seat cushion 11 in the event of a collision at the rear of the vehicle, the rotational center of the pawl 43 may not be distant from the rotational center of the latch 42, accordingly the seat cushion 11 may not be detached from the lock apparatus 40. Furthermore, according to the embodiment, because the stopping portion 47b for regulating the rotational of the latch 42 toward the releasing position is formed at the connecting plate 47, the latch may not be turned over, accordingly the seat cushion 11 may surely be returned from the releasing position toward the locking position.

In the embodiment, the lock apparatus is applied to the vehicle seat 10 that is mounted to a most rear seat of an automobile such as a van or a minivan; however, the lock apparatus according to the embodiment may be applied to a seat of any type of vehicle.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such misalignments, changes and equivalents which fall within the spirit and scope of the present invention as defined in the claims, be embraced thereby.

The invention claimed is:

1. A lock apparatus for a vehicle seat comprising:
a protruding portion formed at the side of a seat cushion so as to protrude therefrom, the seat cushion being movable between a usable position and a retracted position relative to a vehicle floor;
a guide wall member adapted to be fixed at the vehicle floor and having a guide groove with which the protruding portion is engaged so that a moving path of the protruding portion is regulated between the usable position and the retracted position of the seat cushion;
a latch formed with an opening portion within which the protruding portion is engagable or disengageable and supported by the guide wall member so as to be freely rotatable between a releasing position at which the protruding portion is not engaged with the opening portion and a locking position at which the protruding portion enters the opening portion so as not to be disengaged therefrom;
a sliding member formed so as to protrude from the latch and having a sliding surface formed at an outer circumferential surface thereof;
a latch biasing member for applying a biasing force to the latch so as to rotate in a direction from the releasing position to the locking position;
a pawl freely rotatably supported at the guide wall member so as to face the sliding surface of the sliding member and arranged so as to be parallel to and distant from the latch in a width direction of the seat cushion;
a cam surface formed at the pawl for rotating the latch so as to sandwich the protruding portion between an inner surface of the opening portion of the latch and an end surface of the guide groove at the side of the usable position in order to regulate the rotation of the latch toward the releasing position;
a pawl biasing member applying a biasing force to the pawl so as to rotate in a direction in which the cam surface presses the sliding surface of the sliding member;
a releasing lever freely rotatably supported at the guide wall member so as to be parallel to and distant from the pawl in the width direction of the seat cushion; and
a releasing member formed so as to protrude from the releasing lever in order to rotate the pawl by pressing a releasing portion formed at the pawl in a direction against the biasing force applied to the pawl by the pawl biasing member.

2. The lock apparatus for the vehicle seat according to claim 1, wherein the protruding portion, the latch, the pawl and the releasing lever are arranged from top to bottom of the lock apparatus in the mentioned order and arranged in a manner where the latch partially overlaps the pawl and the releasing lever partially overlaps the pawl when the releasing lever is rotated upon a releasing operation.

3. The lock apparatus for the vehicle seat according to claim 2, wherein an end portion of the releasing portion of the pawl is formed so as to be curved in such a way that, when the releasing lever is rotated in order to rotate the pawl in a releasing direction by pressing the releasing portion, the pawl is not rotated after the releasing member moves so as to pass a hypothetical line from one side in the vicinity of the hypothetical line to the other side in the vicinity of the hypothetical line and after the cam surface of the pawl disengages the sliding surface of the sliding member, the hypothetical line connecting a rotational center of the releasing lever and a rotational center of the pawl.

4. The lock apparatus for the vehicle seat according to claim 1, wherein a connecting plate is provided between the rotational center of the pawl and the rotational center of the latch, and the connecting plate includes a stopping portion by which the rotation of the latch toward the releasing position is regulated.

5. The lock apparatus for the vehicle seat according to claim 2, wherein a connecting plate is provided between the rotational center of the pawl and the rotational center of the latch, and the connecting plate includes a stopping portion by which the rotation of the latch toward the releasing position is regulated.

6. The lock apparatus for the vehicle seat according to claim 3, wherein a connecting plate is provided between the rotational center of the pawl and the rotational center of the latch, and the connecting plate includes a stopping portion by which the rotation of the latch toward the releasing position is regulated.

* * * * *